Sept. 20, 1966 W. H. RUEHLE 3,274,542
METHODS OF BAND-EQUALIZING SEISMOGRAMS
Filed March 25, 1963 7 Sheets-Sheet 1
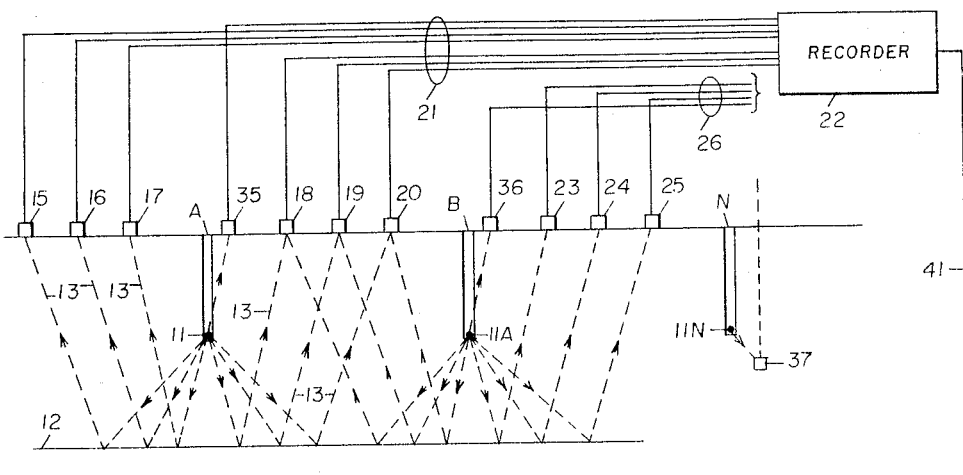
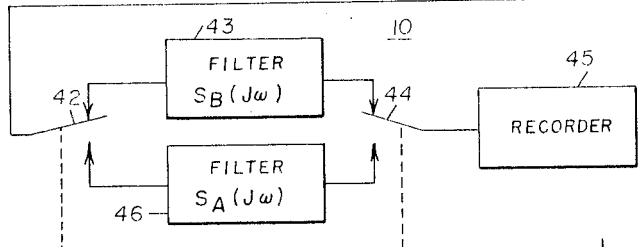
FIG. 1.
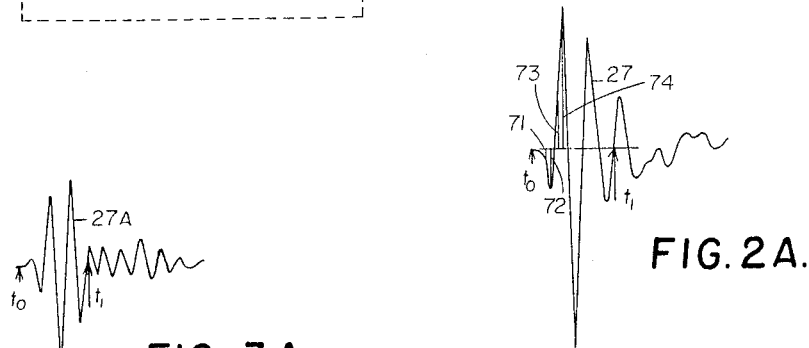
FIG. 2A.
FIG. 3A.
FIG. 3B.
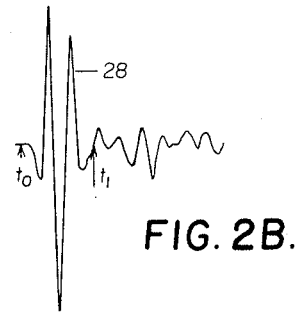
FIG. 2B.

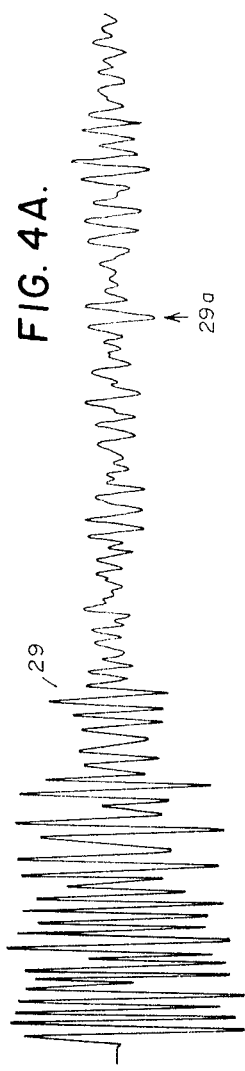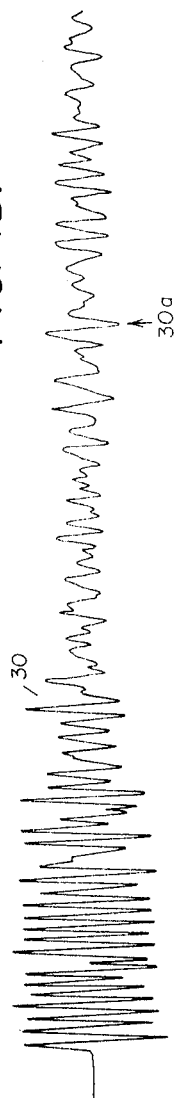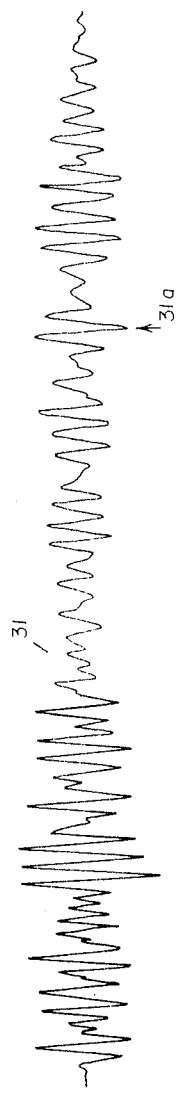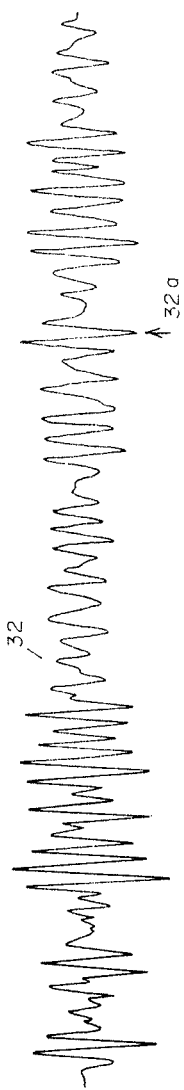

Sept. 20, 1966      W. H. RUEHLE      3,274,542
METHODS OF BAND-EQUALIZING SEISMOGRAMS
Filed March 25, 1963      7 Sheets-Sheet 4

Sept. 20, 1966
W. H. RUEHLE
3,274,542
METHODS OF BAND-EQUALIZING SEISMOGRAMS Filed March 25, 1963
7 Sheets-Sheet 7

3,274,542
METHODS OF BAND-EQUALIZING
SEISMOGRAMS
William H. Ruehle, Dallas, Tex., assignor to Socony Mobil Oil Company, Inc., a corporation of New York
Filed Mar. 25, 1963, Ser. No. 267,592
4 Claims. (Cl. 340—15.5)

The present invention relates to the field of seismology and more particularly to methods of improving the presentation of seismic events and has for an object the removal of characteristics in a seismogram giving rise to the erroneous interpretation of subsurface conditions.

In the interpretation of field seismograms, attention is directed to many factors whose presence or absence provide the basis for decisions regarding the character of subsurface formations. One of the factors is the relative frequency content of the event recorded on the seismogram. For example, seismic energy initiated from a suitable source, when reflected to a detector after having passed through a relatively thick subsurface zone, will characteristically possess frequencies lower than the same energy reflected by way of a thinner subsurface zone. Thus, the seismologist in studying a seismic section, i.e., a large number of seismograms placed in side-by-side relationship and representing a traverse of many miles, will look for, among other things, changes in the frequency content of reflected waveforms. If present, these frequency changes will be interpreted as indicative of the presence of a pinch-out type of stratigraphic trap and will give rise to a recommendation to drill into the purported pinch-out for oil or gas production. However, the character of the source of seismic energies employed in the production of the individual seismograms can also be productive of a similar representation. Thus, if one series of energies is applied to the earth in a shale zone, the frequency of the energies will emphasize low frequencies indicative upon reflection of a thick reflecting zone or section. On the other hand, in energies applied to sand, the higher frequencies are accentuated, giving rise to the interpretation of a thin reflecting zone or section. Since it is quite common to experience along a traverse a gradual change in earth composition from shale to sand, the overall picture presented to the seismologist is one indicative of a pinch-out, while, in fact, the formation or strata may be of substantially uniform thickness throughout the traverse. Mistaken interpretations such as this increase the cost of oil exploration.

In accordance with the present invention, seismograms are corrected to remove therefrom the variation in frequencies introduced due to seismic source energies of different characteristic. More particularly, it has been found that in the simple case involving dynamite-type sources or shots adjacent one another along a traverse the correction may be effected by passing the seismogram produced in response to a first shot through a filter representative of the amplitude-frequency and phase-frequency characteristics of the second shot. Likewise, the seismogram derived from the second shot may be corrected by passing it through a filter representative of the amplitude-frequency and phase-frequency characteristics of the first shot. The net effect is to produce two seismograms which now appear to have been produced from energies of substantially identical character. Seismograms corrected in accordance with the present invention will be referred to as band-equalized seismograms.

In a broad aspect of the present invention, the production of a band-equalized seismogram may be carried out in seismic exploration where pulses of input energy are applied to the earth and a time series of waves resulting from reflections of each said pulse are detected and recorded. The method comprises the generation of difference functions associated with each of the time series of waves and representative of a difference between a selected input function varying as and dependent upon at least one of the pulses of input energy and each of the other input pulses. Each of the time series of waves is filtered by its associated difference function to produce a series of waves that would result if all were produced by the selected input function.

The selected function may be one of the input pulses selected after consideration of the characteristics of all of the input pulses employed in the production of the series of seismograms. On the other hand, the selected function may be selected or derived from more than one of the input functions as represented in the above-mentioned simple case where the seismogram produced in response to a first short or pulse is modified by a filter representative of the amplitude-frequency and phase-frequency characteristics of a second shot and the seismogram derived from the second shot is modified by a filter representative of the amplitude-frequency and phase-frequency characteristics of the first shot or pulse. In both instances the selected function, varying as and dependent upon at least one of the pulses of input energy, gives rise to the production of the seismograms. In the first example, the frequency band of the seismogram is made more narrow, while, in the second and general case, the frequency band may be narrowed or broadened, depending upon the frequency characteristics of the selected function as compared with the other pulses of energy applied to the earth.

In the second form or general method of the present invention, there is produced, from seismic signals generated in response to separate input seismic energy applied at different shot points, improved seismic signals that would be generated if all were produced from a reference input seismic energy. The method comprises the steps of generating a first signal having an amplitude-frequency spectrum $\beta A(\omega)$ representative of the amplitude-frequency spectrum of one of the input seismic energies. In addition, there is generated a second signal having an amplitude-frequency spectrum $\beta'(\omega)$ representative of the reference input seismic energies. The first and second signals are compared to produce a filter whose impulse response in the frequency domain is characterized by an amplitude-frequency spectrum of $\beta'(\omega)/\beta A(\omega)$. The seismic signal produced in response to said one of said input seismic energies then is applied to the filter to produce an improved seismic signal.

In a more specific aspect, there is determined, or otherwise generated, a signal having a frequency base whose amplitude with respect to frequency varies in the same manner as the quotient of the amplitudes associated respectively with Fourier components of one of the inputs or separate energies applied to the earth and of the Fourier components of a selected force dependent upon at least one of the input or separate energies applied to the earth at a shot point and whose phase with respect to frequency varies as the difference between the phase of the Fourier components of one of the inputs or separate energies applied to the earth and of the Fourier components of a selected force dependent upon at least one of the input or separate energies applied to the earth at a shot point. A time-base signal is then generated from the frequency-base signal to give rise to a correction function. Each of the seismic signals is then modified in accordance with the characteristics of the correction function and recorded as a seismogram of the type producible by the selected force.

For further objects and advantages of the present invention, reference may be had to the following detailed description taken in conjunction with the accompanying drawings wherein:

FIGURE 1 is a schematic representation of one system for performing a method of the present invention;

FIGURES 2A, 2B, 3A, and 3B are waveforms of shot energy useful in the understanding of the present invention;

FIGURES 4A and 4B are reproductions representative of typical field seismograms;

FIGURES 5A and 5B are reproductions of the seismograms of FIGURES 4A and 4B corrected in accordance with the present invention;

Figures 8A, 8B:
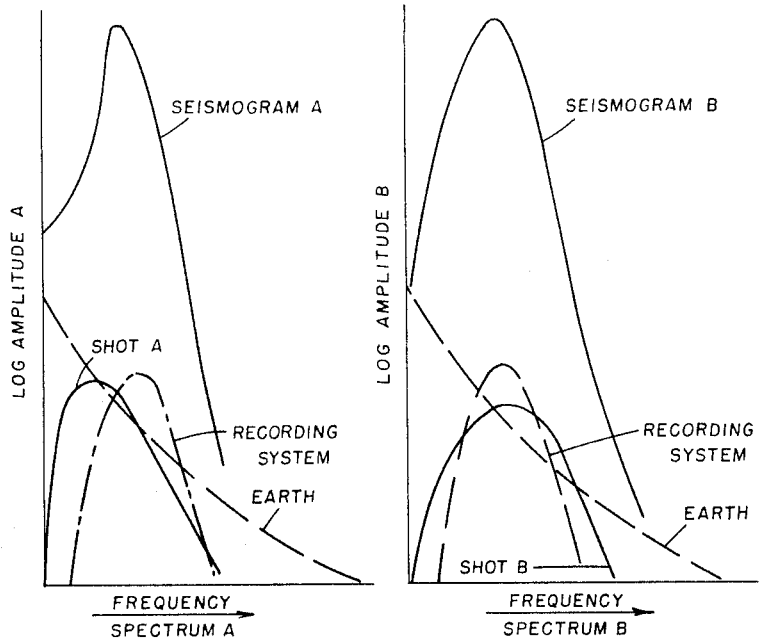
Figure 9:
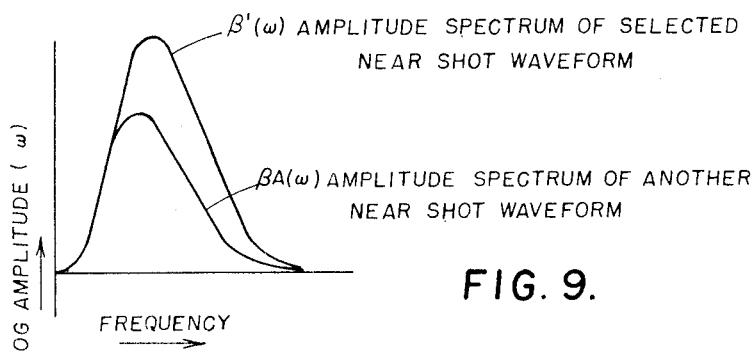
Figure 13:
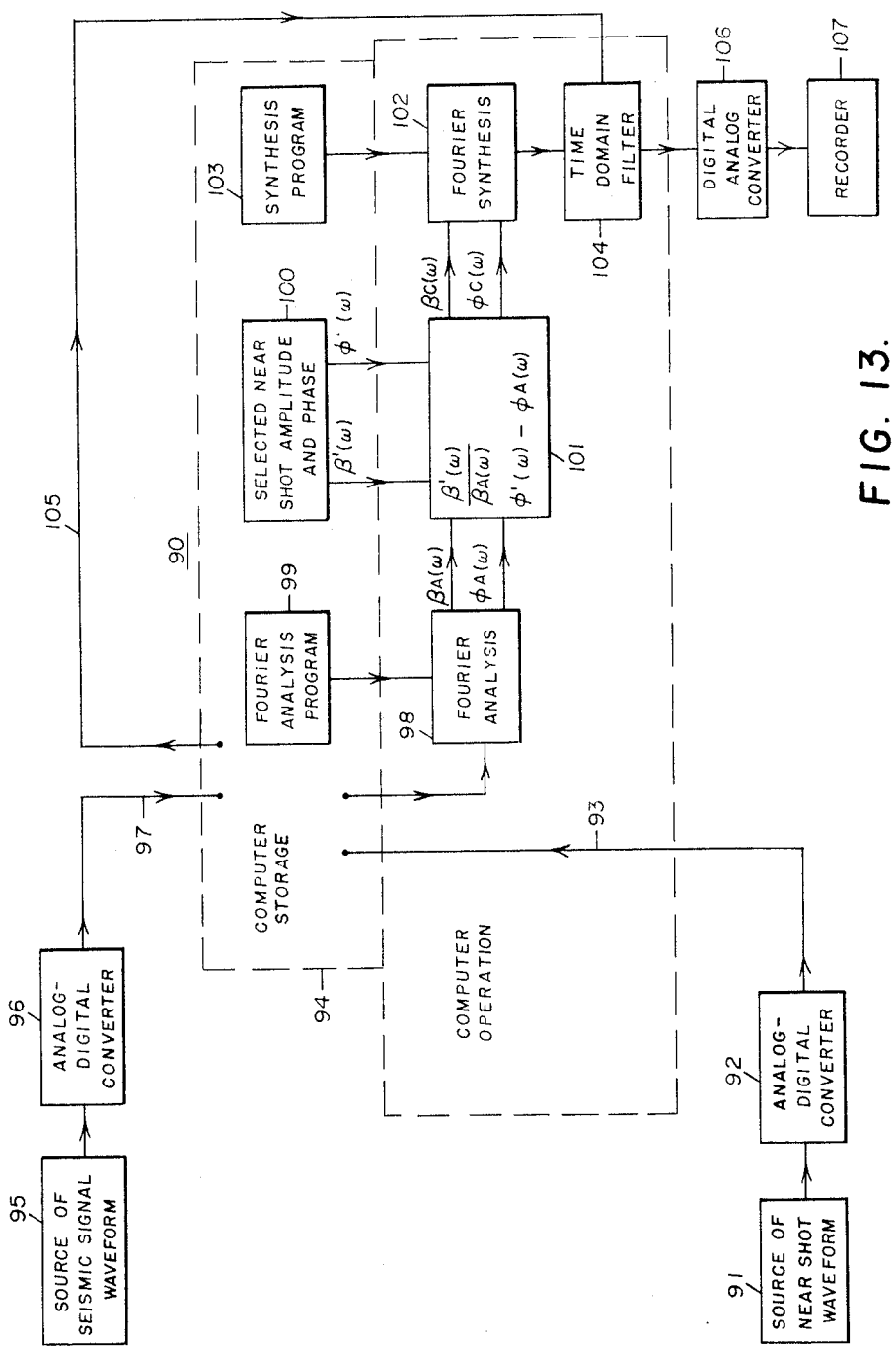
Figure 14:
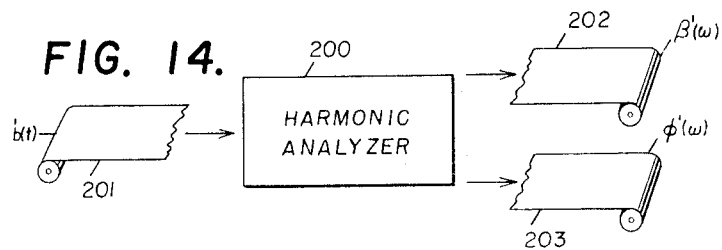
Figure 15:
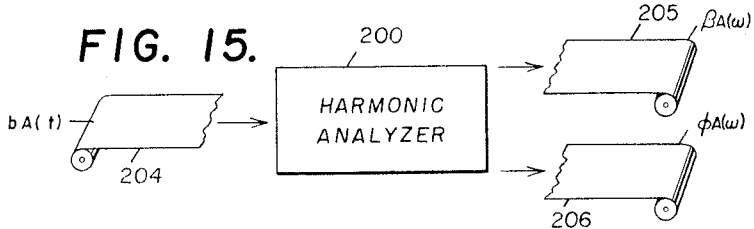
Figure 16:
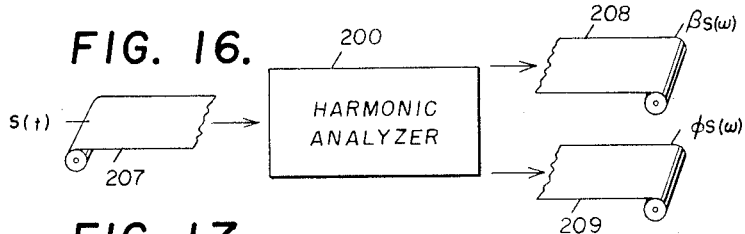
Figure 17:
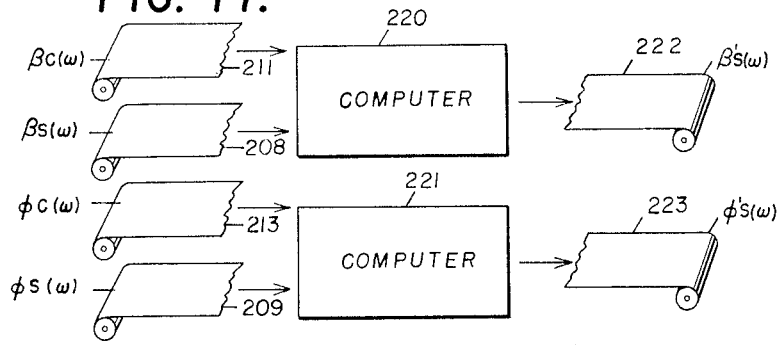
Figure 18:
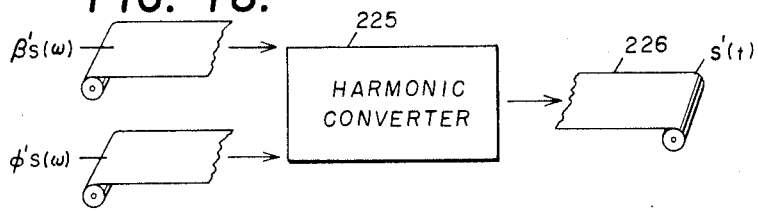
Figure 19:
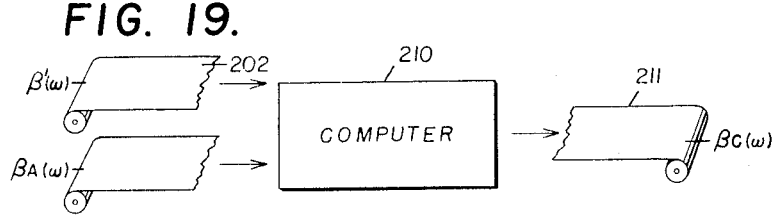
Figure 20:
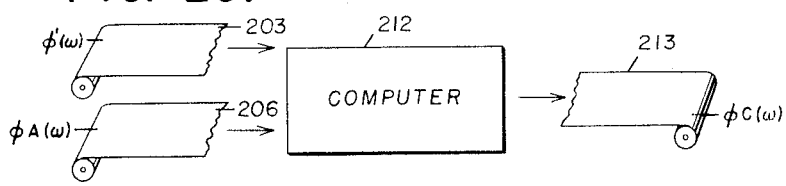
Figure 21:
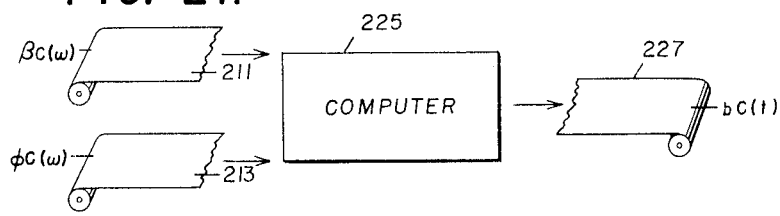
Figure 22:
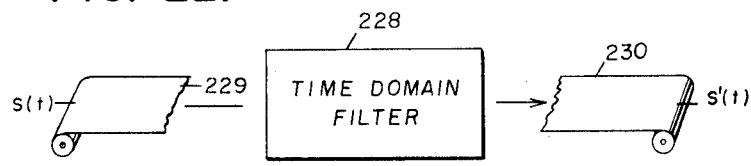

FIGURES 8A and 8B graphically illustrate the amplitude-frequency characteristics of input energies, filters, and resultant seismograms;

FIGURES 9–12 graphically illustrate amplitude-frequency and phase-frequency characteristics of near-shot waveforms and of a correction filter useful in the understanding of the present invention;

FIGURE 13 schematically illustrates further details of a digital system useful in the production of band-equalized seismograms in accordance with the present invention;

FIGURES 14 and 15 illustrate arrangements respectively for analyzing input functions $b'(t)$ and $bA(t)$ to obtain the phase-frequency and amplitude-frequency characteristics thereof;

FIGURE 16 illustrates an arrangement for obtaining the amplitude-frequency and phase-frequency characteristics of a seismogram $S(t)$;

FIGURE 17 illustrates an arrangement for obtaining the phase-frequency and amplitude-frequency characteristics of a corrected seismogram;

FIGURE 18 illustrates an arrangement employing a harmonic converter for synthesizing and otherwise converting to the time domain the character of the corrected seismogram;

FIGURE 19 illustrates an arrangement for obtaining the amplitude-frequency characteristics of a correction function;

FIGURE 20 illustrates an arrangement for obtaining the phase-frequency characteristics of the correction function;

FIGURE 21 illustrates an arrangement for converting the phase-frequency and amplitude-frequency characteristics of the correction function to the time domain; and FIGURE 22 illustrates an arrangement for filtering an original seismogram with the correction function, both in the time domain, to obtain a corrected and band-equalized seismogram.

Referring now to the drawings and more particularly to FIGURE 1, there is illustrated a system 10 for carrying out one embodiment of the present invention. Methods involved in seismic surveying are well known. Briefly, one such method would include the generation along a traverse of seismic energy at a plurality of shot points A, B, . . . N as by the detonation of explosives. The reflected energies are detected by geophones strung along the surface of the earth, and the resultant geophone signal is recorded in phonographically reproducible form. More particularly, a first seismogram is produced by detonating at shot point A a charge of dynamite 11 to generate seismic energy. The resultant seismic waves travel downwardly through the earth. Upon reaching an interface 12, a part of the seismic energy is reflected. The travel paths of energy reflected from the interface 12 are represented by lines 13. Detectors 15–20 at the earth's surface respond to the reflected energy to produce electric signals which are applied by way of electrical circuit conductors in cable 21 to a suitable recorder 22 to produce a recording of a phonographically reproducible type, such as, for example, magnetic tape.

While the detectors 15–20 are shown arranged in a spread spaced on opposite sides of the shot point A, it will be understood that other geophone spread arrangements may be employed in the production of the seismogram. The spread illustrated is convenient for establishing tie-points between seismograms taken at adjacent shot points in that one or more of the geophones will be common to both shot points.

A second seismogram is produced at shot point B in like manner to that described above, the geophones 18–20 and 23–25 being employed in the spread associated with shot point B. The process is conducted at each successive shot point until the end of the traverse as represented by shot point N. The resultant seismograms are composited, arranged as a seismic section, and given to a seismologist for his interpretation. But interpretation can be made difficult by reason of variation in frequency content of seismograms due other than to lithological variation.

Undesirable variations in frequency content is seismograms are due primarily to the variation in frequency content of the seismic energies applied to the earth. The fact that such is the case is exemplified by the amplitude-frequency spectra illustrated in FIGURES 8A and 8B. It is evident that the frequency spectrum of seismogram B is wider than that of seismogram A. Inasmuch as the same recording system was employed for each trace and since both traces were obtained at the same location of the earth, the earth frequency spectrum and the recording system frequency spectrum are the same. Thus, only one element causes the wide variation in frequency spectra and that is the frequency spectrum of each shot. A plot of the amplitude-frequency spectrum of shot A reveals a frequency range much narrower than that of shot B as shown in FIGURE 8B. It now becomes evident that the frequency content of a seismogram will be dependent upon the frequency content of the seismic energy and that with wide ranges of frequency content as may be expected with variations in charge content, placement and the environment of the shot, the seismologist's task of interpretation is difficult.

It will be recalled that the surface layers in which shot holes are located along a traverse are possessed of different characteristics. These surface layers may be compacted as characteristic of limestone or may be loosely consolidated. They may be comprised substantially of sand or of shale or a combination of both. Accordingly, the frequency content of each shot, assuming the same amount and character of explosive, will vary in a manner dependent upon the characteristics of the surface layer.

As a specific example of the problem I have illustrated in FIGURES 2A and 2B, representative waveforms 27 and 28 respectively are representative of the input energy applied to shot holes A and B. These inputs, which differ in frequency content, were productive respectively of seismogram 29, FIGURE 4A, and of seismogram 30, FIGURE 4B. An interpreter could not say that these seismograms were produced in the arrangement shown in FIGURE 1 employing the common geophone 19; and yet they were. A careful study of these seismograms, which are copies of actual field seismograms, indicates that they were obtained at different locales and disclose reflecting beds of different thickness. For example, the wavelet 29a of seismogram 29 is a reflection. Normal interpretation of its character leads one to the conclusion that it arose from the top surface of a thick bed. On the other hand, wavelet 30a of seismogram 30, occurring at the same time as wavelet 29a, is interpreted as a reflection from a thin bed.

If the shot in all instances is made in practice to assume identical frequency-amplitude characteristics throughout the traverse, or, stated in other words, if the same shot could be employed whenever a seismogram is taken, any changes in the wave pattern could only be due to the changes in the lithology traversed by the energy produced from the shot. These conditions, of course, in the field are impossible to attain because of the reasons set forth concerning the environment in which the shot hole is located, that is, whether the surface layer is compacted, whether it is loosely consolidated, or is comprised of sand or shale. However, in accordance with the present invention, corrections may be effected to the seismograms obtained in the field to produce seismic wave patterns that would occur if the same shot, a selected one of the shots employed during the traverse, was employed at each and every shot point.

Continuing with the specific example, we find that seismograms 29 and 30 corrected in accordance with the present invention take on the character respectively of seismograms 31 and 32 (FIGURES 5A, 5B). The reflection wavelet 29a is now wavelet 31a, and reflection wavelet 30a becomes wavelet 32a. Note the striking similarity between wavelets 31a and 32a. Both now indicate the presence of a thin bed giving rise to the reflections. Known geology confirmed this.

In accordance with the present invention, the inconsistencies of seismograms are obviated by the modification of each seismogram in a manner to compensate for variations in the characteristic of the input functions as represented by the different shot impulses 27 and 28 of FIGURES 2A and 2B.

In one embodiment, the desired result is attained by filtering seismogram 29 with a filter whose impulse response is the input characteristic of seismogram 30 and then filtering seismogram 30 with a filter whose impulse response is the input characteristic of seismogram 29.

The invention will now be described as applied to the band equalization of seismic waveforms originating from two adjacent shots, as, for example, those which have been produced in response to the generation of energy at shot points A and B. In this case, as in all applications of the present invention, it is desirable to obtain a recording of the character of the seismic energy applied at each shot point. This seismic energy, hereinafter referred to as a near-shot waveform, may be obtained by any well-known technique. For example, the near-shot waveform may be obtained by employing an uphole geophone 35 (FIGURE 1) which detects energy traveling toward the surface of the earth from shot 11. Similarly, a geophone 36 may be located at or near the surface of the earth to detect the energy produced by the shot 11A. The signals from the geophones 35 and 36 respectively are transmitted by way of suitable conductors in cables 21 and 26 to a reproducible recording system 22. If desired, the near-shot waveform may in the alternative be derived by locating a geophone at a point below a shot hole. Such arrangement is shown with respect to shot point N wherein the geophone 37 is located below the shot 11N. In all instances the waveforms are recorded in reproducible manner, and typical waveforms 27 and 28 are illustrated in FIGURES 2A and 2B.

Having obtained the character of the input waveforms, the next step is to filter the seismogram produced at shot point A with a filter whose impulse response is the input energy at shot point B. Similarly, the seismogram produced at shot point B is filtered by a filter whose impulse response is the input energy at shot point A. The net result is two seismograms which would have been produced if exactly the same input energy had been used in the original production.

The system of FIGURE 1 carries out the method described above. More particularly, the seismogram produced at shot point A and identified $S(t)A$ is applied by way of conductor 41 and switch 42 to the input of filter 43 whose impulse response is that of waveform 28. The output of the filter 43, corrected seismogram $S(t)AB$, is then applied by way of switch 44 to the input of a second recorder 45 for recording. Now, with the switches 42 and 44 moved to engage their lower fixed contacts, seismogram $S(t)B$ is applied by way of conductor 41 and switch 42 to the input of a filter 46 whose impulse response is that of the waveform 27. The filtered seismogram $S(t)BA$ is now applied by way of the switch 43 to the recorder 44 for recording. The corrected seismograms will have the appearance of those illustrated in FIGURES 5A and 5B.

The above-described operation may be better understood by reference to a mathematical analysis definitive of the method described. In general, any seismogram takes the form:

$$S(t) = b(t) * r(t) * E(t) \qquad (1)$$

where,

\* is a shorthand expression for the process of convolution;

$S(t)$ is an expression for the seismogram in the time domain;

$b(t)$ is an expression for the shot energy in the time domain;

$r(t)$ is an expression for the reflectivity or earth filter in the time domain; and $E(t)$ is an expression for the frequency response or frequency characteristic of the electronic equipment employed in the recording of the seismogram and would include the geophones, the amplifiers, and the other associated equipments.

Now, writing the expressions for each of the seismograms obtained at shot holes A and B, we have for the seismogram produced from the energy created at shot hole A the following:

$$S(t)A = b(t)A * r(t)A * E(t)A \qquad (2)$$

The seismogram produced from the energy created at shot point B may be expressed as:

$$S(t)B = b(t)B * r(t)B * E(t)B \qquad (3)$$

Since the same recording system has been employed in making both of the seismograms, we know from the discussion of FIGURES 8A and 8B that $E(t)A = E(t)B$. It is further known that the attenuation or reflectivity of the earth in approximately the same area would be substantionally the same, and therefore we can assume that $r(t)A = r(t)B$. It now becomes obvious that since the seismograms do not appear to be of like character the only major contribution to the difference between them is the character of the shot energy. Now, if we filter or convolve the seismogram obtained at one shot point with the character of input energy at the second shot point, we can write:

$$S(t)AB = b(t)A * r(t)A * E(t)A * b(t)B \qquad (4)$$

and likewise:

$$S(t)BA = b(t)B * r(t)B * E(t)B * b(t)A \qquad (5)$$

Both seismograms $S(t)AB$ and $S(t)BA$ now have the same input energy or waveform, namely, $b(t)A * b(t)B$; and therefore there have been generated seismograms as would arise if identical shots were employed in the production of both of them.

An example of the identity of the input energies is shown in FIGURES 3A, 3B where the waveform 27A is waveform 27 (FIGURE 2A) filtered by a filter whose impulse response is waveform 28 (FIGURE 2B) over the time period $t_0 - t_1$. The waveform 28A was evolved by filtering the waveform 28 (FIGURE 2B) by a filter whose impulse response is the waveform 27 (FIGURE 2A) over the time period $t_0 - t_1$. Note the identity between the waveforms 27A and 28A over the time period $t_0 - t_1$. Had each of the filters been expanded in time as by taking further samples, we would find that the waveforms 27A and 28A would be identical over their entire duration.

Figure 6:
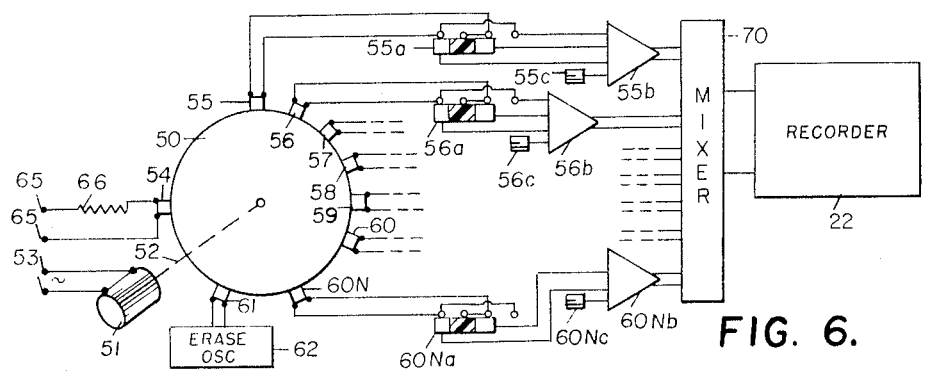
FIGURE 6 is a schematic representation of a time-domain filter useful in the performance of the present invention.

One form of filter suitable for the convolving of the seismograms with the correction function or difference function is illustrated in FIGURE 6. The difference function is defined as that function associated with each of the seismic signals and representative of the difference between the input energy giving rise to the seismic signal and the selected input energy. The selected input energy is defined as varying as a function of time and dependent upon at least one of the separate energies. Either of the filters 43, 46 may be of the time-domain type including a drum 50 having provision for carrying about its periphery a recording material of the magnetic type. The drum 50 is rotated by way of a suitable driving means such as the motor 51 shown coupled to the drum by way of the shaft 52 and having connections to a suitable source of power such as represented by the terminals 53. A plurality of transducers comprising recording, playback, and erase heads are mounted around the drum and adjacent the recording medium. Specifically, the heads include a recording head 54, playback heads 55, 56, 57, 58, 59, 60 and 60N, and an erase head 61. The erase head is connected to a suitable erase oscillator 62. The playback heads 55–60N are movable relative to one another and to the recording head 54. The output of each of the pickup transducers or playback heads 55–60N is connected by way of conductors and polarity-reversing switches $55a$–$60Na$ to gain-control amplifiers $55b$–$60Nb$ whose output is in turn connected to mixer 70 where the outputs are added and fed to the recorder 22.

In setting up the filter for each convolution in the analog sense, the near-shot waveform, for example, the waveform 27 (FIGURE 2A), will be provided with a time scale along which there will be marked off segments of one millisecond duration. From these points there will be drawn to the boundary of the waveform a plurality of vertical lines, for example, the lines 71, 72, 73, and 74. Each of these lines will be associated with one of the pickup or playback heads so that each playback head will be separated one from the other by a distance of approximately one millisecond in time. The polarity-reversing switches will now be set to produce either a negative-going or a positive-going output, depending upon the direction of the vertical lines. For example, the playback head 55 will have its associated polarity-reversing switch $55a$ set to produce a negative-going output as will the polarity-reversing switch $56a$ associated with transducer or playback head 56. The switches associated with the heads 57 and 58, although not shown in order to simplify the drawing, will be set to produce positive-going output pulses corresponding with the lines 73 and 74 of FIGURE 2A. Now, each of the amplifiers $55b$–$60Nb$ will be set with respect to gain by adjustment of gain control knobs $55c$–$60Nc$ so as to weigh the outputs of the recorder heads.

The seismogram, in this case the seismogram 30 (FIGURE 4B), will be applied as by way of input terminals 65 and loading resistor 66 to the recording head 54. As portions of the seismogram pass the various playback heads 55–60N, output signals will be derived, varied in polarity as necessary, changed in gain, and added together in the mixer 70. The sum signal, or total signal, will now be applied to the recorder 22 for the production of the corrected seismogram.

Any suitable mixer can be employed, serving the function of an adding circuit. Many forms of circuits are known to those skilled in the art and further discussion is unnecessary.

Figure 7:
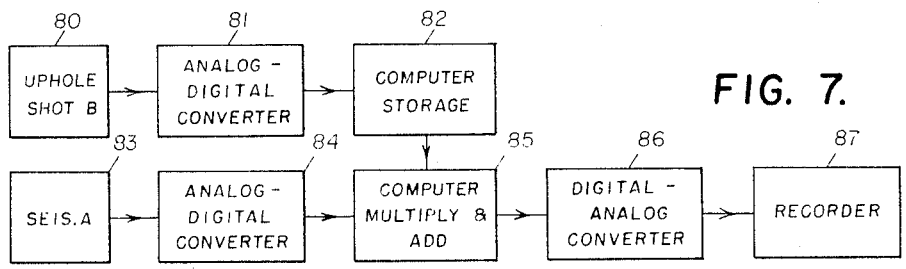
FIGURE 7 represents in block schematic form a digital equivalent of the system of FIGURE 6.

Now that an analog system has been completely disclosed for carrying out one method of the present invention, it will be apparent to those skilled in the art that other systems may be employed for band equalizing seismograms. One such system is disclosed in FIGURE 7 and constitutes a digital approach to performing the method. In the system of FIGURE 7, the analog signal representing the input energy at shot B will be played back from a suitable playback mechanism 80 and applied to an analog-digital converter 81. The digitalized representation of the input energy will be stored in computer storage element 82. Now, the analog representation of the seismogram derived from energy applied at shot point A will be generated by suitable playback equipment 83 and converted to digital form by way of an analog-digital converter 84. The digitalized representation of the input energy at shot point B will now be applied from computer storage 82 to a computer element 85 which will filter or convolve this input representation with the digitalized representation of the seismogram. The resultant digital information will now be applied to a digital-analog converter 86 whose output will be recorded by the recorder 87 as a frequency band-corrected seismogram.

Particularities regarding the analog-digital converters 81, 84 and the digital-analog converter 86 will not be set forth inasmuch as they are well known in the art and many different forms are readily available for performing the conversion functions.

Likewise, it is well known in the art that the process of filtering or convolution is in reality a series of multiplication and addition steps and that programs for performing the filtering or convolution are also within the scope of those skilled in the art of programming digital computers. It is sufficient merely to refer to the convolution integral in order that a skilled programer instruct the computer as to the steps to be carried out in solution of that integral.

Thus far we have considered one species of the present invention wherein the desired input function $b'(t)$ was expressed as the convolution of two adjacent shot point inputs or:

$$b'(t) = bA(t) * bB(t) \qquad (6)$$

While the method of band equilization gives valuable results, it is readily apparent that band equalization also results in narrowing the frequency band of the seismogram. In the ideal case and in accordance with the present invention, we can assume the existence of a selected input of shot energy which is to be employed as a standard. Once having established the standard, other shot energy may now be compared with this standard and a correction filter evolved so that each of the seismograms may be upgraded in requency content substantially to correspond with the frequency content of the selected seismogram. Stating it another way, the process of band broadening would result in the production of a series of seismograms that would have been produced had the selected input energy been employed in the field production of each of them. The determination of the selected input may be carried out as by an examination of each of the uphole waveforms representing the shot point energy. Having found the best form of energy, that is, one having the broadest frequency characteristics, we have identified the selected or desired input function $b'(t)$. This selected input energy may be expressed in the frequency domain as:

$$b'(\omega) = \beta'(\omega) \cdot e[\varphi'(\omega)] \qquad (7)$$

where,
$\beta'(\omega)$ is the amplitude spectrum, and
$\varphi'(\omega)$ is the phase spectrum.

Now, expressing any other shot point energy $bA(t)$ in the frequency domain, there may be written:

$$bA(\omega) = \beta A(\omega) \cdot e[\varphi' A(\omega)] \qquad (8)$$

The correction necessary to equate the amplitude spectra and the phase spectra of both the input energies is expressed as:

$$bC(\omega) = \frac{\beta'(\omega)}{BA(\omega)} \cdot e[\varphi'(\omega) - \varphi A(\omega)] \qquad (9)$$

Having obtained the correction filter in the frequency domain, a conversion is made to the time to obtain the correction filter in the time domain. The seismogram $S(t)$ will now be convolved therewith to produce a corrected seismogram $S'(t)$, which seismogram would have been produced if the input energy $b'(t)$ had been employed in the field generation of the seismogram. Mathematically, this may be expressed as:

$$S(t) * bC(t) = S'(t) = bC(t) * bA(t) * r(t) \qquad (10)$$

The determination of the amplitude and phase spectra of the correction filter is illustrated in FIGURES 9–12 wherein the amplitude spectrum $\beta'(\omega)$ of the selected near-shot waveform has been plotted on the same scale with the amplitude spectrum $\beta A(\omega)$ of another near-shot waveform. The ordinates are in terms of the logarithm and therefore it becomes a simple matter visually to subtract one amplitude from the other and to plot out as in FIGURE 11 the amplitude spectrum $\beta C(\omega)$ of the correction filter. Since the amplitudes were originally plotted as logarithms, the subtraction process performs the operation of:

$$\log \beta'(\omega)/\beta A(\omega) \qquad (11)$$

Figure 10:
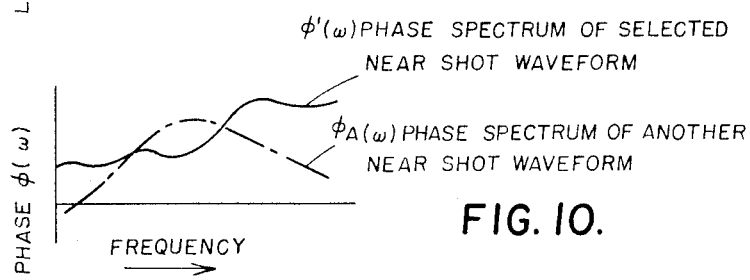
Figure 11:
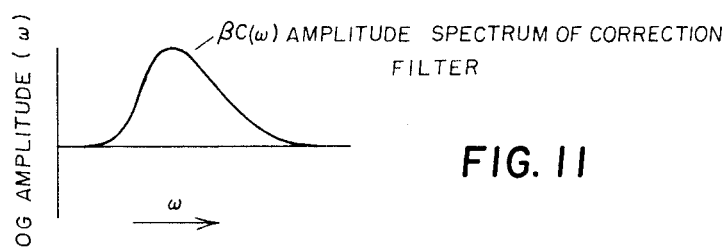
Figure 12:
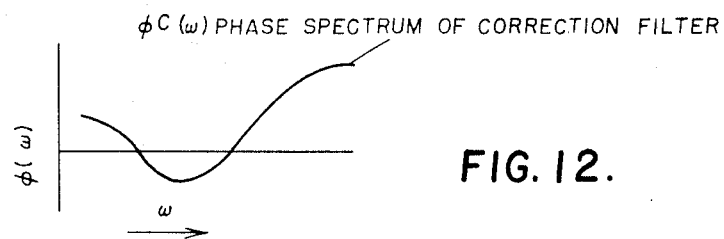

In FIGURE 10, the phase spectrum $\varphi'(\omega)$ of the selected near-shot waveform has been plotted on the same scale with the phase spectrum $\varphi A(\omega)$ of another near-shot waveform. Here again by the simple porcess of subtraction there will be obtained values which will be plotted as the phase spectrum $\varphi C(\omega)$ of the correction filter. The result of subtraction is illustrated in FIGURE 12.

Through suitable mechanisms of synthesis, the amplitude and phase spectra of the correction filter may be converted from the frequency domain into the time domain in order that the seismogram derived from the other near-shot waveform may be filtered to generate a seismogram that would have been generated in the field by a shot having the characteristics of the desired input function $b'(t)$.

Any number of mechanisms may be employed in carrying out the band broadening equalization of seismograms. One such system is illustrated in FIGURE 13 as comprising a digital computer 90 which has been suitably programmed to carry out the process. Any computer of medium size may be employed. Such computers as the IBM 704 are suitable. Certainly, computers of the larger size such as the IBM 7090 and the CDC 1604 will be adequate for performing the necessary computation. In the flow diagram illustrated in FIGURE 13, the near-shot waveform $bA(t)$ will be regenerated by way of a playback system 91, and this analog system applied to a suitable analog-digital converter 92. The digitalized representation of the near-shot waveform will be applied by way of conductor 93 to computer storage 94. Similarly, the seismogram which was field generated in response to the input energy $bA(t)$ will be played back by suitable playback equipment 95 and converted to a digital representation by way of the analog-digital converter 96. The digitalized representation is applied also to computer storage by way of conductor 97. At a suitable time determined by computer programing, the digital representation of the near-shot waveform will be recalled from storage for a Fourier analysis in order to convert the waveform into its amplitude and phase spectra. This operation is represented by the block 98, which operation is controlled by a Fourier analysis program conveniently contained within the computer storage and represented by block 99.

The computer previously has been programmed with the amplitude and phase spectra of the desired or selected near-shot waveform. This information contained within the computer storage and represented by block 100 is now recalled, and the operation of division of the amplitude spectra and subtraction of the phase spectra takes place within the block 101 to produce an output representing the amplitude and phase spectra of the correction filter. The amplitude and phase spectra are converted from the frequency domain to the time domain through a Fourier synthesis operation carried on in block 102, which operation is controlled by a synthesis program contained within the computer storage 94 and represented by block 103. The output or result of the Fourier synthesis is applied to the time-domain filter 104. At the same time, the digital representation of the seismic signal is recalled from computer storage and applied by way of conductor 105 to another input of the time-domain filter 104 where it is convolved with the correction filter $bC(t)$. The digital output is now applied to a digital-analog converter 106 and the resultant analog signal recorded by a recorder which may be of the magnetic tape variety 107.

In accordance with the method carried out by the apparatus disclosed in FIGURE 13, there is generated a new series of seismograms whose frequency content will vary only by reason of lithologic changes traversed by the seismic energy. Accordingly, an interpreter will now have greater assurance in rendering a considered opinion regarding subsurface conditions. And now for the first time it will be possible with reliability to pick stratigraphic traps and particularly those of the pinch-out variety.

The method of the present invention may also be performed by way of analog equipment as will now be demonstrated. It will be recalled that the first step is to convert the desired or selected input energy to the frequency domain and more particularly to derive a representation of its amplitude and phase spectra. This is accomplished as in FIGURE 14 by applying to a harmonic analyzer 200 an input signal $b'(t)$ previously recorded in a reproducible form on the medium 201. Use of a harmonic analyzer 200 will result in two records 202 and 203 respectively representative of the amplitude-frequency spectrum $\beta'(\omega)$ and the phase-frequency spectrum $\varphi'(\omega)$. The recordings 202 and 203 again will be in a reproducible form.

In similar fashion, the other near-shot energy or waveform $bA'(t)$ previously recorded on record 204 will be applied to the harmonic analyzer 200 as shown in FIGURE 15. The output of the harmonic analyzer 200 will result in the production of two recordings 205 and 206 respectively representative of the amplitude-frequency spectrum $\beta A(\omega)$ and the phase-frequency spectrum $\varphi A(\omega)$.

Likewise, the seismogram to be corrected, $S(t)$, previously recorded in reproducible form on record 207 will be applied to the harmonic analyzer 200 to produce output signals resulting in recordings 208 and 209 respectively representative of the amplitude-frequency spectrum $\beta S(\omega)$ and the phase-frequency spectrum $\varphi S(\omega)$. The harmonic analyzer 200 used in connection with the present invention need not be described in detail since harmonic analyzers in general are well known to those skilled in the art. It is desirable however that the analyzer employed shall have high resolution. Suitable harmonic analyzers may be of the type referred to in U.S. Letters Patent 2,696,891 issued to J. Neufeld on December 14, 1954.

With the Fourier-frequency spectra available for both the selected input energy $b'(t)$ and the other input energy $bA(t)$, it will now be possible to generate the amplitude-frequency and phase-frequency characteristics of the desired correction filter $bC(t)$. The amplitude-frequency characteristic $\beta C(\omega)$ of the correction filter is generated by the arrangement of FIGURE 19 by computer 210. The computer 210 solves Equation 11 by a division process. The recordings 202 and 205 are applied as inputs to the computer 210 which divides the signal on recording 202 by the signal on recording 205 to produce an output representing the amplitude-frequency spectrum $\beta C(\omega)$ of the correction filter. A suitable computer for performing the division is disclosed in the text Electronic Analog Computers, Korn and Korn, second edition, pages 338 and 339.

The phase-frequency spectrum $\varphi C(\omega)$ of the correction filter is determined by employing a computer 212 (FIGURE 20) whose inputs are the recordings 203 and 206 respectively representative of the phase-frequency spectrum $\varphi'(\omega)$ of the selected input energy and the phase-frequency spectrum $\varphi A(\omega)$ of another input energy. The computer 212 solves the bracketed expression of Equation 9 by subtracting or otherwise determining the difference between the spectra $\varphi'(\omega)$ and $\varphi A(\omega)$. The result is recorded on a phonographically reproducible recording medium 213 representing the phase-frequency spectrum $\varphi C(\omega)$ of the correction filter. A suitable computer 212 for performing the subtraction operation may be found at pages 14–16 of the above-mentioned text by Korn and Korn wherein a phase inverter is added to one of the inputs in order that subtraction may be performed through a summing operation.

The amplitude-frequency spectrum $\beta' S(\omega)$ and the phase-frequency spectrum $\varphi' S(\omega)$ are determined by employing computers 220 and 221 disclosed in FIGURE 17. The computer 220 is a multiplier which may be of the type disclosed in the aforesaid Korn and Korn text beginning at page 251. Inputs to the computer 220 are the signals $\beta C(\omega)$ and $\beta S(\omega)$ respectively recorded on the recording mediums 211 and 208. The recordings 211 and 208 are of the phonographically reproducible type. The multiplication performed by the computer results in an output signal recorded on phonographically reproducible medium 222 and representative of the amplitude-frequency spectrum $\beta' S(\omega)$ which is the amplitude-frequency spectrum of the corrected seismogram.

The computer 221 provides an adding function to add the phase-frequency spectra $\varphi C(\omega)$ and $\varphi S(\omega)$. The computer 221 may be of the type disclosed in Korn and Korn at pages 14–16. The information contained on the recording mediums 213 and 209 is fed into the computer 221 which outputs a signal representative of the phase-frequency spectrum $\varphi' S(\omega)$ of the corrected seismogram and recorded in phonographically reproducible form on the recording medium 223.

Now, by applying a suitable harmonic converter 225 as shown in FIGURE 18, it will be possible to synthesize from the Fourier spectra a seismogram $S'(t)$ represented in the time domain. The harmonic converter 225 may be of the type illustrated in FIGURE 13 of the Neufeld patent wherein the amplitude-frequency spectrum $\beta' S(\omega)$ and the phase-frequency spectrum $\varphi' S(\omega)$ are applied as inputs to the converter. The converter now operates upon these signals to produce an output signal which may be recorded in any suitable form and which will be representative of a seismogram which would have been produced in the field had the desired or selected input energy been employed in its generation.

The recording mediums employed herein have been described as the phonographically reproducible type. These will include magnetic tape recordings, photographic recordings, or other forms wherein the information contained may be played back in one presentation or another. It will be appreciated that it is well within the scope of those skilled in the art to translate from one type of recording medium into another. Thus, for example, where the harmonic converter 225 requires photographic records, it will be a relatively simple matter to convert from a magnetic tape recording to a photographic recording and likewise to convert the information on a photographic recording to an equivalent electrical signal which may be fed directly into an electronic computer or recorded on magnetic tape.

There will now be described a modification which avoids the necessity of translating the siesmogram to be corrected into its Fourier-frequency components. It will be recalled that during the course of the preceding method there were generated as by way of the computer 210 and 212 of FIGURES 19 and 20 the phase-frequency and the amplitude-frequency spectra of the correction filter. Having this information, it will be possible as illustrated in FIGURE 21 immediately to convert this information or otherwise translate the characteristics of the correction filter to the time domain. In carrying out the translation, computer 225 will be employed having as its inputs the amplitude-frequency spectrum $\beta C(\omega)$ and the phase-frequency spectrum $\varphi C(\omega)$ respectively recorded on the recording mediums 211 and 213. The output of the computer will be a time-domain signal representative of the correction filter $bC(t)$ and may be recorded on the recording medium 227. The signal recorded may ultimately be translated either in digital form or in wiggle form of the type illustrated in FIGURE 2A.

All the information is now available to correct the field seismogram $S(t)$. To this end and as shown in FIGURE 22, the time-domain filter 228 is employed to convolve or otherwise filter the field seismogram with the correction input energy. The field seismogram $S(t)$ may appear upon a magnetic recording medium 229 and the signal recorded thereon translated by suitable readout devices and applied to the input of the time-domain filter 228. The time-domain filter 228 may be of the same type illustrated in FIGURE 6 which functions to convolve, in the manner above described, the field seismogram with the correction function to produce a recording 230 representative of the corrected field seismogram $S'(t)$ which would have been generated had the desired or selected input energy been employed in the field generation thereof.

While several modifications of the present invention have been illustrated, it is to be understood that other modifications may be made within the scope of the appended claims.

What is claimed is:

1. A method of producing from seismic signals produced in response to separate input energies applied at shot points seismic records representing waves which would travel from the shot points to reception points if a reference input seismic energy were applied to the earth at each shot point, comprising the steps of:
 (a) generating a signal having a frequency base which with respect to frequency varies in the same manner as the quotient of the amplitude associated respectively with Fourier components of one of said separate input energies and of Fourier components of said reference seismic energy and having a phase which varies in accordance with the difference between the phase angles respectively of said Fourier components of said one of said separate input energies and of said Fourier components of said reference seismic energy,
 (b) generating from said frequency-base signal a time-base signal,
 (c) modifying, in accordance with the characteristics of said time-base signal, the seismic signal produced in response to said one of said separate input energies, and
 (d) recording said modified signal as a seismogram of the type producible by said reference seismic energy.

2. The method of producing improved seismograms which comprises:
 (a) generating as a first time function the earth movement at a receiving station resulting from application of a burst of energy to the earth at a first transmitting station,
 (b) generating as a second time function said burst of energy at said first transmitting station,
 (c) harmonically analyzing said second time function to produce a frequency function $\beta A(\omega)$ and a frequency function $\varphi A(\omega)$,
 (d) generating as a third time function a force applied at another transmitting station,
 (e) harmonically analyzing said third time function to produce a frequency function $\beta'(\omega)$ and a frequency function $\varphi'(\omega)$, where $\beta'(\omega)$ and $\varphi'(\omega)$ are respectively the amplitude-frequency and the phase-frequency characteristics of said force, and $\beta A(\omega)$ and $\varphi A(\omega)$ are respectively the amplitude-frequency and the phase-frequency characteristics of the time function of said energy, (f) combining the harmonic analyses of said frequency functions in the relations expressed by $\beta'(\omega)/\beta A(\omega)$ and $\varphi'(\omega)-\varphi A(\omega)$ in determination of a corrective frequency function, (g) synthesizing said corrective frequency function to produce a time function of the corrective function, (h) convolving said synthesized corrective function and said first time function to produce a time function of earth movement which would result from the application of said force to the earth at the transmitting station, and (i) recording the last-named time function as a seismogram.

3. In seismic exploration where seismic waves are generated successively at depths in the earth at spaced-apart shot points, the steps which comprise:

(a) detecting near-shot signals adjacent each of the shot points, (b) detecting seismic waves arising from each of the shots in spreads of geophones spaced from the shot points, (c) selecting from the near-shot waveforms a near-shot waveform having measurable amplitude-frequency and phase-frequency characteristics, (d) generating filters for all seismic signals resulting from near-shot waveforms differing in amplitude-frequency and phase-frequency characteristics from the amplitude-frequency, phase-frequency characteristics of the selected near-shot waveform, each of said filters having an impulse response whose log of the amplitude-frequency, phase-frequency characteristic is the difference between the log of the amplitude-frequency, phase-frequency characteristic of the selected near-shot waveform and the associated near-shot waveform, (e) applying seismic signals resulting from detection of said seismic waves to their associated filters to produce filtered seismic signals arising from seismic waves subjected to the same phase-frequency and amplitude-frequency modification in the steps of generation, detection, and filtering thereof, and (f) recording the filtered seismic signals.

4. A method of producing from seismic signals generated in response to separate input seismic energies applied at different shot points improved seismic signals that would be generated if all were produced from a reference input seismic energy, comprising the steps of:

(a) generating a first signal having an amplitude-frequency spectrum $\beta A(\omega)$ representative of the amplitude-frequency spectrum of one of the input seismic energies, (b) generating a second signal having an amplitude-frequency spectrum $\beta'(\omega)$ representative of the reference input seismic energy, (c) comparing said first and second signals to produce a filter whose impulse response in the frequency domain is characterized by an amplitude-frequency spectrum of $\beta'(\omega)/\beta A(\omega)$, and (d) applying to said filter the seismic signal generated in response to said one of said input seismic energies to produce an improved seismic signal.

References Cited by the Examiner

UNITED STATES PATENTS

| | | | |
|---|---|---|---|
| 3,076,176 | 1/1963 | Lawrence | 340—15.5 |
| 3,076,177 | 1/1963 | Lawrence et al. | 340—15.5 |
| 3,180,445 | 4/1965 | Schwartz et al. | 181—.5 |
| 3,182,743 | 5/1965 | McCollum | 181—.5 |

BENJAMIN A. BORCHELT, *Primary Examiner.*

R. M. SKOLNIK, *Assistant Examiner.*

UNITED STATES PATENT OFFICE
CERTIFICATE OF CORRECTION

Patent No. 3,274,542

September 20, 1966

William H. Ruehle

It is hereby certified that error appears in the above numbered patent requiring correction and that the said Letters Patent should read as corrected below.

In the heading to the printed specification, lines 4 and 5, for "assignor to Socony Mobil Oil Company, Inc., a corporation of New York" read -- assignor to Mobil Oil Corportion, a corporation of New York --; column 2, line 17, for "short" read -- shot --; column 4, line 22, for "is" read -- in --; column 6, lines 43 and 44, for "substationally" read -- substantially --; column 8, line 44 for "requency" read -- frequency --; lines 58 and 59, Equation 7 should appear as shown below instead of as in the patent:

$$b'(\omega) = \beta'(\omega) \cdot e^{[\varphi'(\omega)]}$$

lines 66 and 67, Equation 8 should appear as shown below instead of as in the patent:

$$bA(\omega) = \beta A(\omega) \cdot e^{[\varphi A(\omega)]}$$

lines 71 to 73, Equation 9 should appear as shown below instead of as in the patent:

$$bC(\omega) = \frac{\beta'(\omega)}{\beta A(\omega)} \cdot e^{[\varphi'(\omega) - \varphi A(\omega)]}$$

column 9, line 26, for "porcess" read -- process --; column 11, line 66, for "siesmogram" read -- seismogram --; line 69, for "computer" read -- computers --; column 12, line 38, for "amplitude" read -- amplitudes --.

Signed and sealed this 29th day of August 1967.

(SEAL)
Attest:

ERNEST W. SWIDER
Attesting Officer

EDWARD J. BRENNER
Commissioner of Patents